United States Patent
Sipp et al.

(10) Patent No.: US 9,730,548 B1
(45) Date of Patent: Aug. 15, 2017

(54) FUNNEL ASSEMBLY FOR A BEVERAGE BREWER

(71) Applicant: Grindmaster Corporation, Louisville, KY (US)

(72) Inventors: Richard Leon Sipp, Crestwood, KY (US); Mark Anthony Johnson, Elizabethtown, KY (US); Curry Joseph Cates, Louisville, KY (US)

(73) Assignee: Grindmaster Corporation, Louisville, KY (US)

( * ) Notice: Subject to any disclaimer, the term of this patent is extended or adjusted under 35 U.S.C. 154(b) by 1042 days.

(21) Appl. No.: 13/963,628

(22) Filed: Aug. 9, 2013

Related U.S. Application Data

(60) Provisional application No. 61/683,450, filed on Aug. 15, 2012.

(51) Int. Cl.
- *A47J 31/44* (2006.01)
- *A47J 31/46* (2006.01)
- *B67C 11/02* (2006.01)
- *A47J 31/00* (2006.01)

(52) U.S. Cl.
CPC ............. *A47J 31/46* (2013.01); *A47J 31/007* (2013.01); *B67C 11/02* (2013.01)

(58) Field of Classification Search
CPC ............ A47J 31/007; A47J 31/46; H01H 5/04
USPC ..... 99/279, 284, 289 R, 300, 316, 318, 323, 99/323.3; 222/472, 473; 335/305; 116/267

See application file for complete search history.

(56) References Cited

U.S. PATENT DOCUMENTS

| | | | | |
|---|---|---|---|---|
| 3,599,557 A | * | 8/1971 | Leal | A47J 31/0663 99/302 R |
| 4,309,939 A | * | 1/1982 | Stover | A47J 31/002 99/280 |
| 5,245,914 A | * | 9/1993 | Vitous | A47J 31/007 99/280 |
| 5,297,596 A | * | 3/1994 | Anson | B67C 11/02 141/331 |
| 5,309,960 A | * | 5/1994 | Boyd | A47J 31/0657 141/1 |
| 5,476,033 A | * | 12/1995 | Locati | A47J 31/40 99/279 |
| 5,906,211 A | * | 5/1999 | Mason | A24F 13/18 131/256 |
| 6,439,105 B1 | * | 8/2002 | Ford | A47J 31/007 99/280 |

\* cited by examiner

*Primary Examiner* — Alexander Valvis
(74) *Attorney, Agent, or Firm* — Stites & Harbison, PLLC; David W. Nagle, Jr.

(57) ABSTRACT

A funnel assembly for a beverage brewer comprises: a central body with an upper opening for receiving a brewed beverage from the beverage brewer and a lower opening for directing the brewed beverage into a selected one of two or more shuttles; and an upper clip portion configured to snap onto and engage a shaft extending from the beverage brewer, such that the funnel assembly is pivotable about an axis defined by the shaft between a first position in which it directs the brewed beverage into a first of the two or more shuttles and a second position in which it directs the brewed beverage into a second of the two or more shuttles.

9 Claims, 7 Drawing Sheets

FUNNEL ASSEMBLY FOR A BEVERAGE BREWER

CROSS-REFERENCE TO RELATED APPLICATIONS

The present application claims priority to U.S. Provisional Patent Application Ser. No. 61/683,450 filed on Aug. 15, 2012, the entire disclosure of which is incorporated herein by reference.

BACKGROUND OF THE INVENTION

The present invention relates to a beverage brewer.

A wide variety of beverage brewers, including those commonly used for brewing and dispensing coffee and tea, exist in the prior art. Some such brewers require the manual placement of a quantity of ground coffee, tea, or other beverage component into a brewing chamber, and, as part of a brewing cycle, a predetermined volume of hot water is then delivered to the brewing chamber to produce the beverage. Other brewers include a system for metering a predetermined amount of ground coffee or other beverage component from a hopper to the brewing chamber followed by a delivery of a predetermined volume of hot water to the chamber. And, in some such brewers, multi-hopper arrangements may be employed, with each hopper containing a different type of ground coffee or other beverage component, thus allowing the user to choose the kind of beverage to be brewed.

Furthermore, in the food service industry, for example, in restaurant and catering facilities, a portable dispensing container (also referred to as a "shuttle") is often used in combination with a brewer, with the brewed beverage being dispensed into the shuttle. The shuttle is used to convey a hot brewed beverage from a central beverage-making location to one or more convenient locations for dispensing and consumption by food service personnel or the consumers. At that central beverage-making location, it is often desirable to brew multiple types of beverages, such as caffeinated or decaffeinated beverages, with each type of beverage dispensed into its own shuttle.

Thus, there is a need for a beverage brewer that facilitates the dispensing of different types of beverages into different shuttles.

SUMMARY OF THE INVENTION

The present invention is a funnel assembly for a beverage brewer.

A beverage brewer includes a brewing chamber, which receives a filter and a predetermined amount of ground coffee, tea, or other beverage component. A predetermined volume of hot water is then delivered to the brewing chamber to produce a brewed beverage. The brewer is designed to dispense the brewed beverage into two or more shuttles positioned below the brewing chamber. To facilitate the ability to selectively fill one of the shuttles, a funnel assembly made in accordance with the present invention is positioned below the brewing chamber and is pivotable between a first position in which it directs the brewed beverage into a first shuttle and a second position in which it directs the brewed beverage into a second shuttle.

The funnel assembly is generally comprised of a central body in the form of a funnel, with a wide upper opening for receiving the brewed beverage from the brewing chamber, and a narrower lower opening (or spout) for directing the brewed beverage into a selected shuttle. To achieve such pivoting, in some exemplary embodiments, the funnel assembly further comprises a rearward extending appendage, which includes an upper clip portion. The upper clip portion snaps onto and engages a horizontal shaft (such as a bypass water pipe). The funnel assembly may also include a forward extending appendage that serves as a handle, allowing a user to pivot the funnel assembly about a horizontal axis defined by the shaft.

As a further refinement, in some exemplary embodiments, a stop element is positioned over the shaft and secured to the housing of the beverage brewer so it cannot rotate relative to the housing of the brewer. The stop element includes a substantially flat face, with first and second projections extending from the face. When the upper clip portion of the funnel assembly is snapped onto and engages the shaft extending from the brewer, a lower tab of the funnel assembly is effectively positioned between the first and second projections extending from the face of the stop element. A magnet element is housed within the lower tab of the funnel assembly, and corresponding magnet elements are housed within the first and second projections of the stop element. Thus, when the user pivots the funnel assembly to the first position, the magnetic force between the magnet element housed within the lower tab of the funnel assembly and the corresponding magnet element housed within the first projection holds the funnel assembly in place in the first position. Similarly, when the user pivots the funnel assembly to the second position, the magnetic force between the magnet element housed within the lower tab of the funnel assembly and the corresponding magnet element housed within the second projection holds the funnel assembly in place in the second position.

DETAILED DESCRIPTION OF THE INVENTION

The present invention is a funnel assembly for a beverage brewer.

Figure 1:
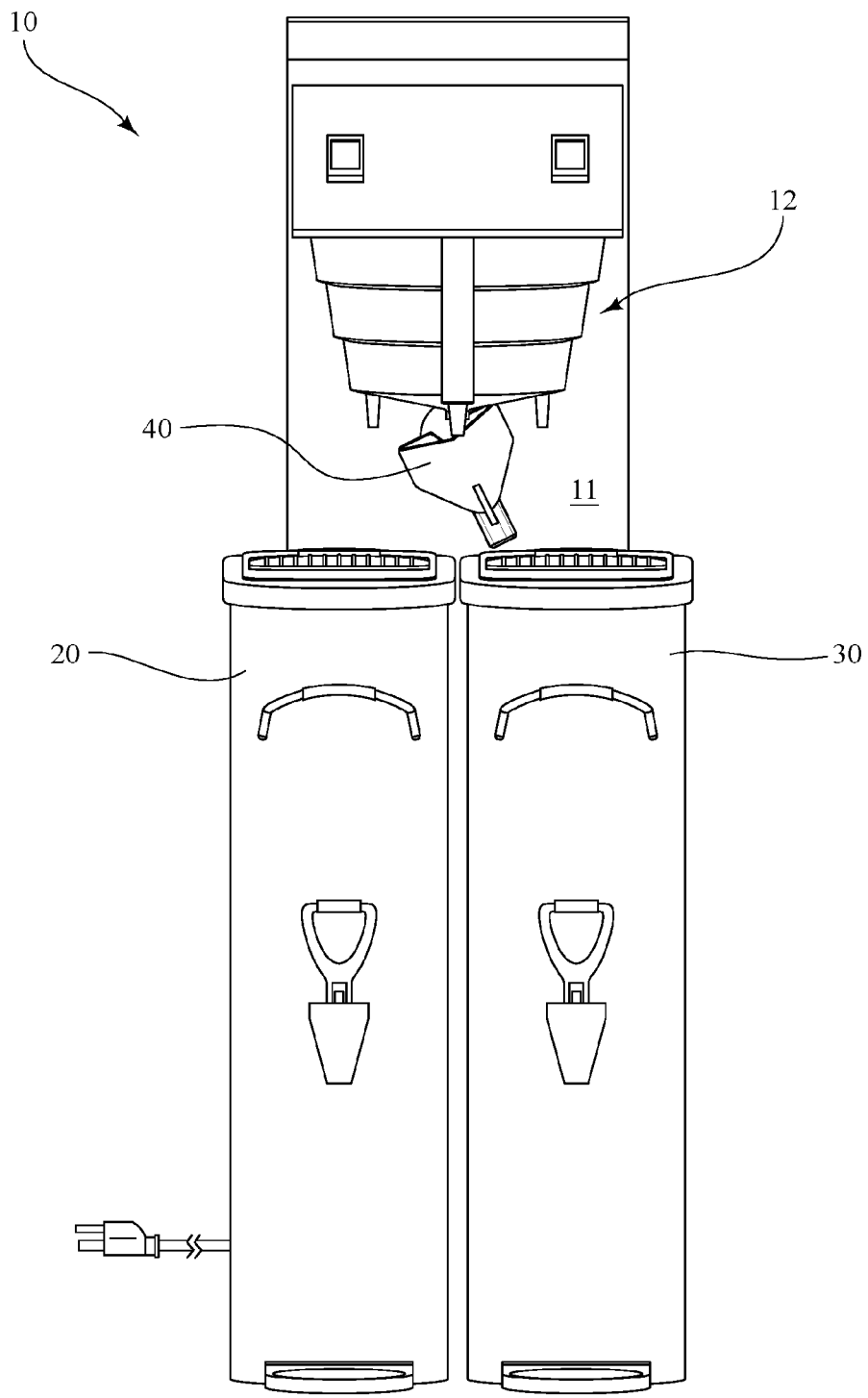
FIG. 1 is a front view of a beverage brewer that includes an exemplary funnel assembly made in accordance with the present invention.
Figure 1A:
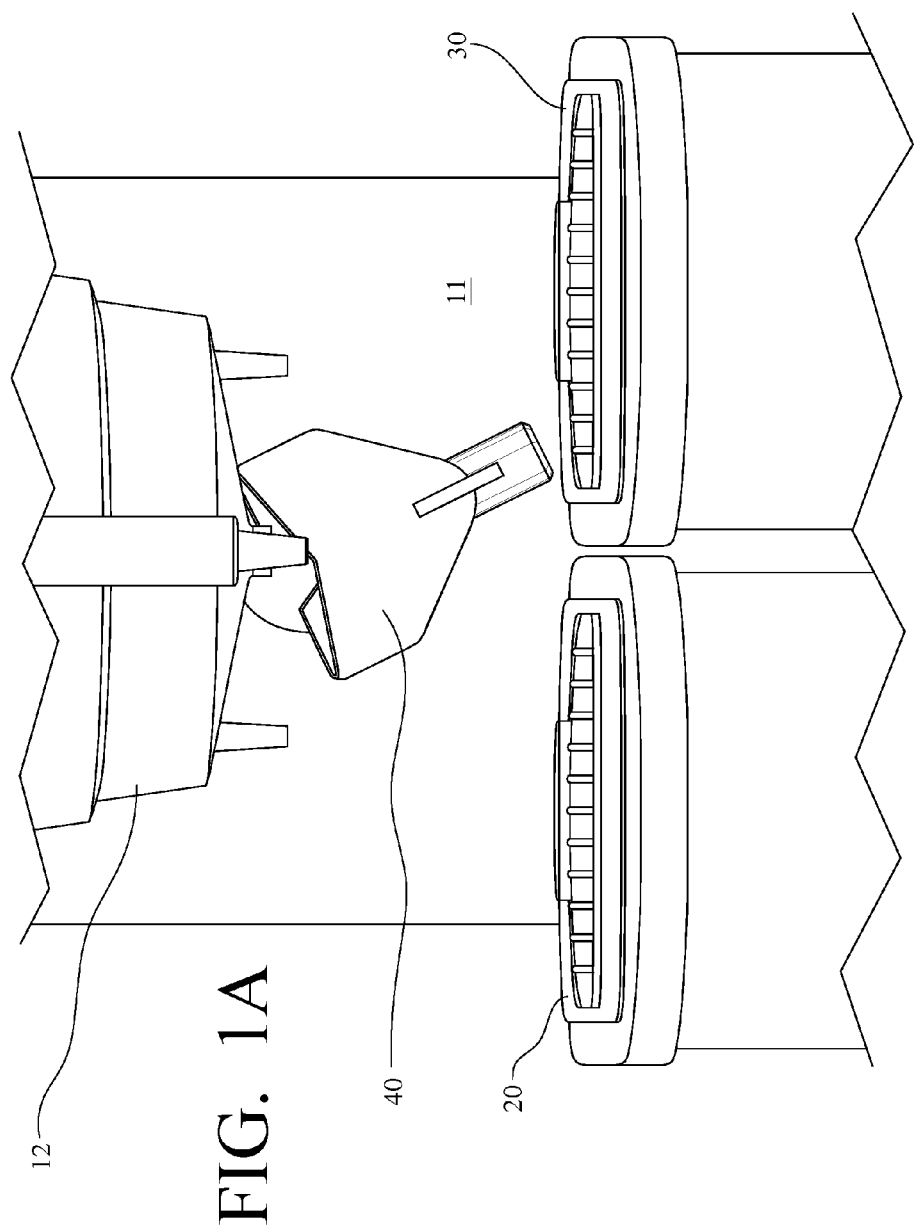
FIG. 1A is an enlarged, partial front view of the beverage brewer and the funnel assembly of FIG. 1.

FIGS. 1 and 1A are front views of a beverage brewer 10 that include an exemplary funnel assembly 40 made in accordance with the present invention. As with prior art brewers, the beverage brewer 10 includes a brewing chamber (as generally indicated by reference number 12), which receives a filter and a predetermined amount of ground coffee, tea, or other beverage component. A predetermined volume of hot water is then delivered to the brewing chamber 12 to produce a brewed beverage. The brewer 10 is designed to dispense the brewed beverage into one of two shuttles 20, 30 positioned below the brewing chamber 12. For example, a first shuttle 20 could be used to receive and store a caffeinated beverage, while a second shuttle 30 could be used to receive and store a decaffeinated beverage.

To facilitate the ability to selectively fill one of the shuttles 20, 30, the funnel assembly 40 is positioned below the brewing chamber 12 and is pivotable between a first position in which it directs the brewed beverage into the first shuttle 20 and a second position (as shown in FIGS. 1 and 1A) in which it directs the brewed beverage into the second shuttle 30.

Referring now to FIGS. 2-6, the funnel assembly 40 is generally comprised of a central body 42 in the form of a funnel, with a wide upper opening 44 for receiving the brewed beverage from the brewing chamber 12, and a narrower lower opening (or spout) 46 for directing the brewed beverage into a selected shuttle 20, 30. As stated above, the funnel assembly 40 is pivotable between the first position in which it directs the brewed beverage into the first shuttle 20 and the second position in which it directs the brewed beverage into the second shuttle 30.

In this exemplary embodiment, to achieve such pivoting, the funnel assembly 40 further comprises a rearward extending appendage 50, which includes an upper clip portion 52 and a lower tab 54 (the importance of which will be described below). The upper clip portion 52 snaps onto and engages a horizontal shaft 80 extending from the brewer 10. In this case, the shaft 80 is actually a bypass water pipe that allows water to be delivered through the funnel assembly 40 and directly into the selected shuttle 20, 30, bypassing the brewing chamber 12.

Finally, in this exemplary embodiment, the funnel assembly 40 also comprises a forward extending appendage 60 that serves as a handle, allowing a user to pivot the funnel assembly 40 about a horizontal axis defined by the shaft 80. Thus, in practice, a user can pivot the funnel assembly 40 between the first position in which it directs the brewed beverage into the first shuttle 20 and the second position in which it directs the brewed beverage into the second shuttle 30.

Figure 2:
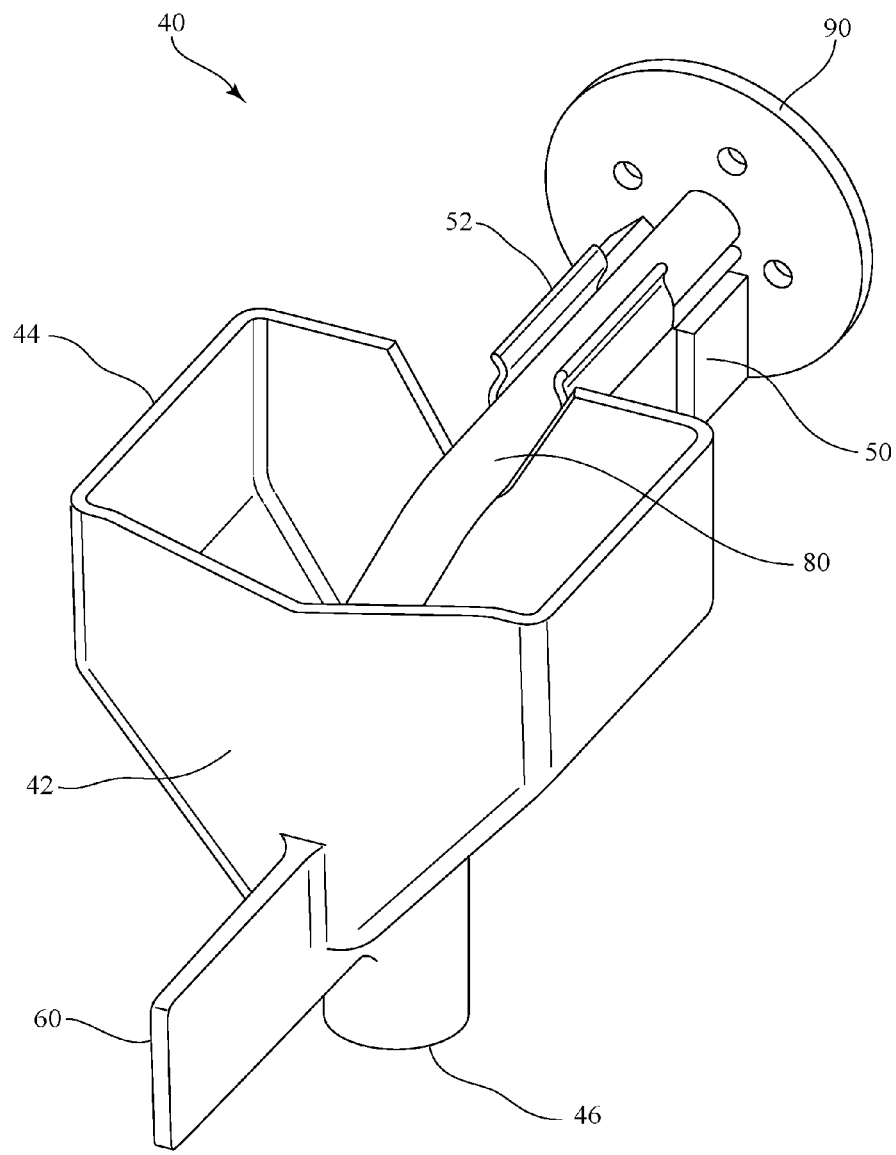
FIG. 2 is a front perspective view of the funnel assembly of FIG. 1 as mounted to a shaft (water pipe) of the beverage brewer.
Figure 3:
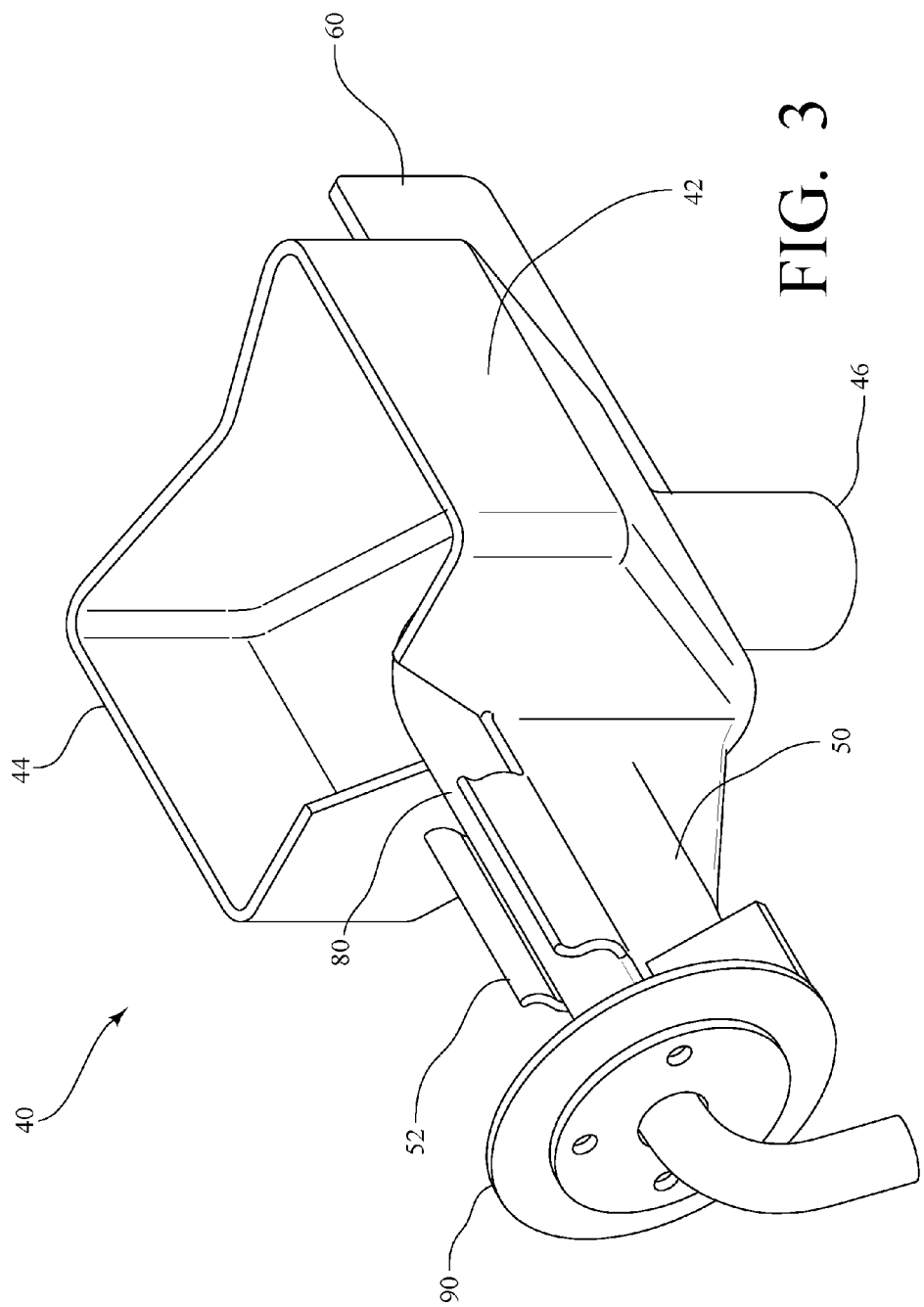
FIG. 3 is a rear perspective view of the funnel assembly of FIG. 1 as mounted to the shaft (water pipe) of the beverage brewer.
Figure 4:
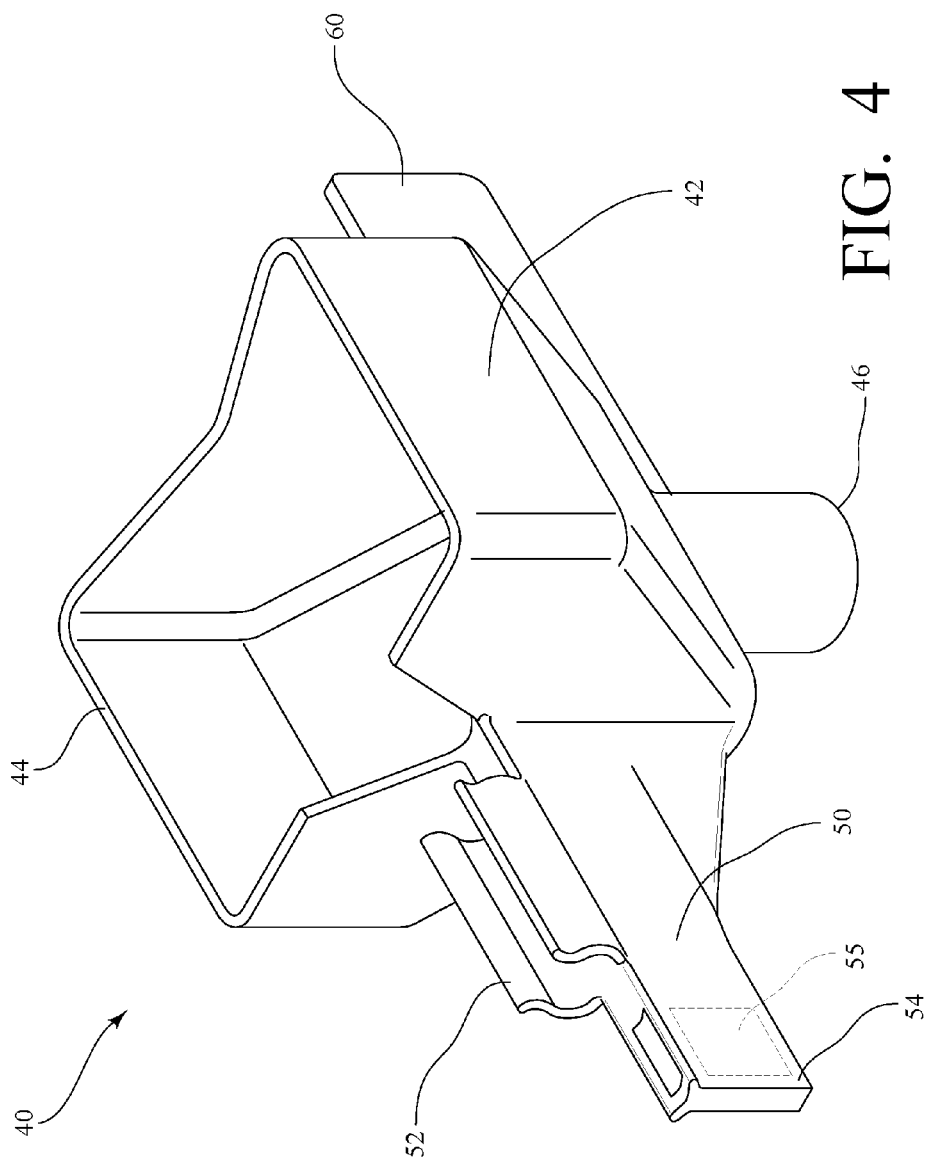
FIG. 4 is a rear perspective view of the funnel assembly of FIG. 1 as mounted to the shaft (water pipe) of the beverage brewer.
Figure 5:
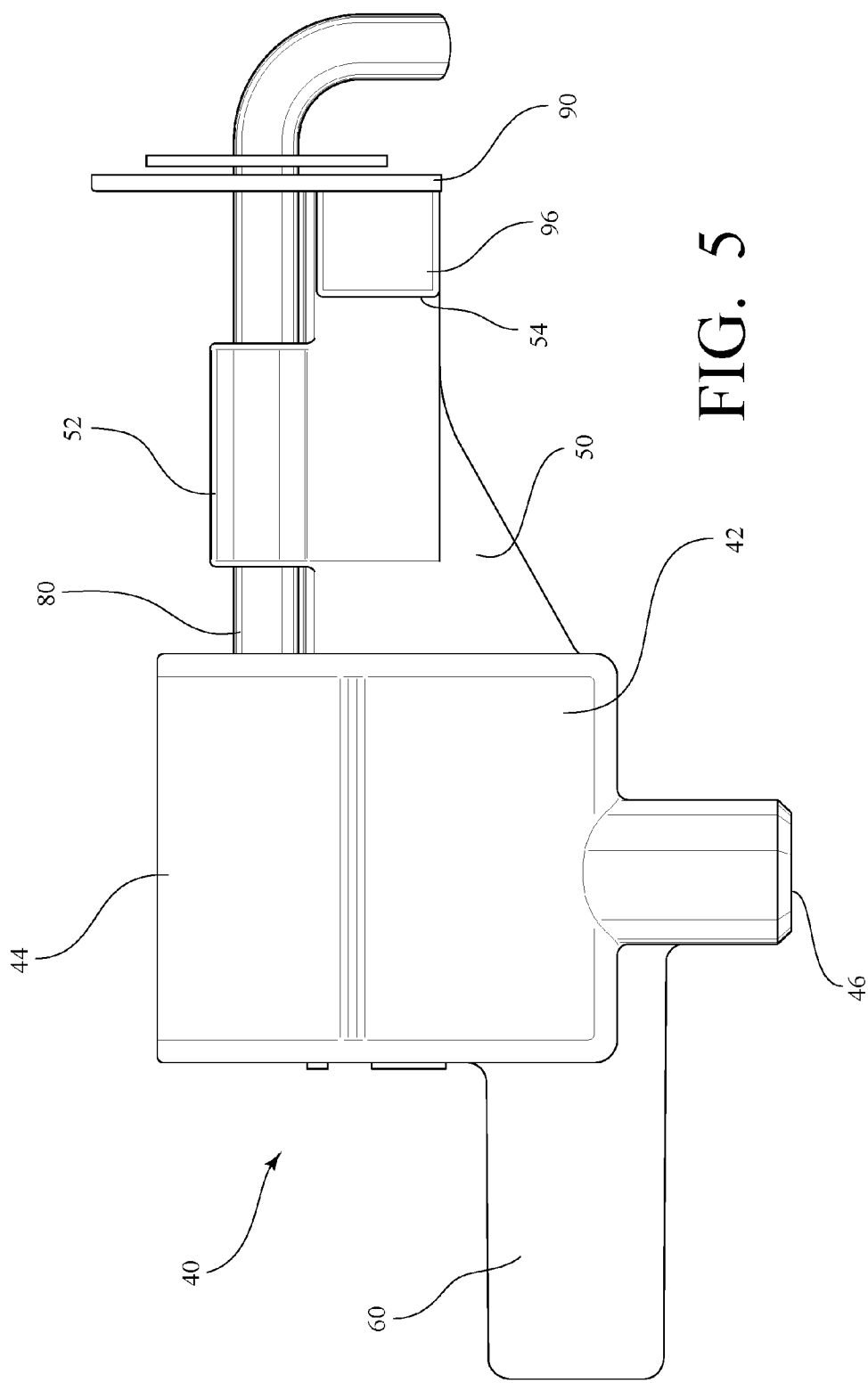
FIG. 5 is a side view of the funnel assembly of FIG. 1 as mounted to the shaft (water pipe) of the beverage brewer.
Figure 6:
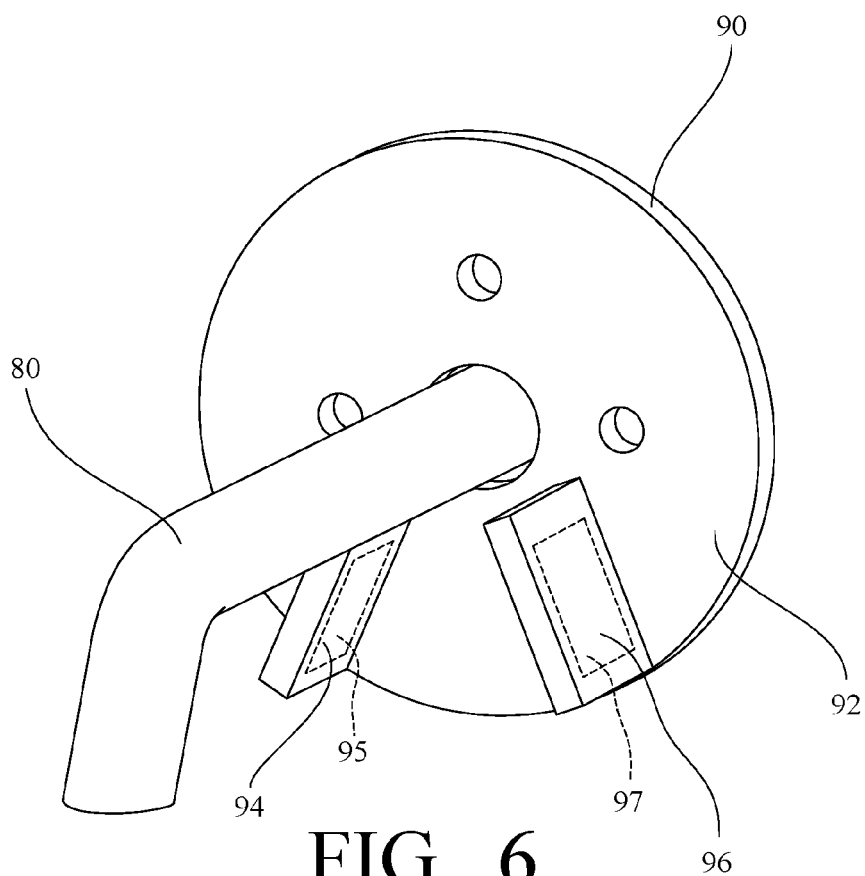
FIG. 6 is a front perspective view of a stop element for use with the funnel assembly of FIG. 1.

As a further refinement, in this exemplary embodiment, a stop element 90 is also positioned over the shaft 80, as best shown in FIGS. 2-3 and 5-6. The stop element 90 is secured to the housing 11 of the beverage brewer 10, so that it cannot rotate relative to the housing 11 of the brewer 10, for example, by using one or more fasteners (not shown). As best shown in FIG. 6, the stop element includes a substantially flat face 92, with first and second projections 94, 96 extending from the face 92. In this exemplary embodiment, if the face 92 of the stop element 90 is likened to a clock, the first and second projections 94, 96 are at approximately 5:00 and 7:00. Referring now to FIGS. 2-3 and 5, when the upper clip portion 52 of the funnel assembly 40 is snapped onto and engages the shaft 80 extending from the brewer 10, the lower tab 54 is effectively positioned between the first and second projections 94, 96 extending from the face 92 of the stop element 90. A magnet element 55 (as shown in phantom in FIG. 4) is housed within the lower tab 54, and corresponding magnet elements 95, 97 (as shown in phantom in FIG. 6) are housed within the first and second projections 94, 96. Thus, when the user pivots the funnel assembly 40 to the first position, the magnetic force between the magnet element 55 housed within the lower tab 54 and the corresponding magnet element 95 housed within the first projection 94 holds the funnel assembly 40 in place in the first position. Similarly, when the user pivots the funnel assembly 40 to the second position, the magnetic force between the magnet element 55 housed within the lower tab 54 and the corresponding magnet element 97 housed within the second projection 96 holds the funnel assembly 40 in place in the second position.

One of ordinary skill in the art will recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A beverage brewer, comprising:
   a housing;
   a brewing chamber configured to receive a beverage component and a predetermined volume of hot water to produce a brewed beverage;
   a funnel assembly configured to direct the brewed beverage from the brewing chamber to at least two shuttles positioned below the brewing chamber, said funnel assembly pivoting about a horizontal axis relative to the housing, which axis extends from and is perpendicular to a front surface of the housing, between a first position relative to the housing in which it would direct the brewed beverage into a first of the at least two shuttles and a second position relative to the housing in which it would direct the brewed beverage into a second of the at least two shuttles; and
   a stop element secured to the housing of the beverage brewer and including a face and first and second projections extending from the face, the first projection corresponding to the first position of the funnel assembly, and the second projection corresponding to the second position of the funnel assembly;
   wherein a magnet element is housed within the funnel assembly, and wherein corresponding magnet elements are housed within the first and second projections of the stop element, such that, when a user pivots the funnel assembly to the first position, a magnetic force between the magnet element housed within the funnel assembly and the corresponding magnet element housed within the first projection holds the funnel assembly in place in the first position, and, when the user pivots the funnel assembly to the second position, a magnetic force between the magnet element housed within the funnel assembly and the corresponding magnet element housed within the second projection holds the funnel assembly in place in the second position.

2. The beverage brewer as recited in claim 1, wherein the funnel assembly includes a central body with an upper opening for receiving the brewed beverage from the brewing chamber and a lower opening for directing the brewed beverage into a selected one of the shuttles.

3. The beverage brewer as recited in claim 1, wherein the funnel assembly includes an upper clip portion configured to snap onto and engage a shaft extending from the front surface of the housing of the beverage brewer, said shaft defining the horizontal axis about which the funnel assembly pivots.

4. The beverage brewer as recited in claim 1, wherein the funnel assembly includes a handle to facilitate pivoting of the funnel assembly between the first position and the second position.

5. A beverage brewer, comprising:

a housing;

a brewing chamber configured to receive a beverage component and a predetermined volume of hot water to produce a brewed beverage; and a funnel assembly configured to direct the brewed beverage from the brewing chamber to at least two shuttles positioned below the brewing chamber, said funnel assembly pivoting about a substantially horizontal axis relative to the housing between a first position relative to the housing in which it would direct the brewed beverage into a first of the at least two shuttles and a second position relative to the housing in which it would direct the brewed beverage into a second of the at least two shuttles;

wherein the funnel assembly includes an upper clip portion configured to snap onto and engage a bypass water pipe extending from the housing of the beverage brewer, said bypass water pipe defining the substantially horizontal axis about which the funnel assembly pivots.

6. The beverage brewer as recited in claim 5, and further comprising a stop element secured to the housing of the beverage brewer and including a face and first and second projections extending from the face, the first projection corresponding to the first position of the funnel assembly, and the second projection corresponding to the second position of the funnel assembly.

7. The beverage brewer as recited in claim 5, wherein a magnet element is housed within the funnel assembly, and wherein corresponding magnet elements are housed within the first and second projections of the stop element, such that, when a user pivots the funnel assembly to the first position, a magnetic force between the magnet element housed within the funnel assembly and the corresponding magnet element housed within the first projection holds the funnel assembly in place in the first position, and, when the user pivots the funnel assembly to the second position, a magnetic force between the magnet element housed within the funnel assembly and the corresponding magnet element housed within the second projection holds the funnel assembly in place in the second position.

8. The beverage brewer as recited in claim 5, wherein the funnel assembly includes a central body with an upper opening for receiving the brewed beverage from the brewing chamber and a lower opening for directing the brewed beverage into a selected one of the shuttles.

9. The beverage brewer as recited in claim 5, wherein the funnel assembly includes a handle to facilitate pivoting of the funnel assembly between the first position and the second position.

* * * * *